United States Patent Office 2,966,479
Patented Dec. 27, 1960

2,966,479
PROCESS FOR PREPARING HIGH MOLECULAR WEIGHT POLYESTERS FROM MONOEPOXIDES

Rudolph F. Fischer, Oakland, Calif., assignor to Shell Oil Company, a corporation of Delaware No Drawing. Filed Sept. 27, 1957, Ser. No. 686,570

12 Claims. (Cl. 260—78.4)

This invention relates to a new process for preparing polyesters. More particularly, the invention relates to a new process for preparing high molecular weight linear polyesters from monoepoxides and to the resulting products.

More particularly, the invention relates to a new and highly efficient process for preparing linear polyesters having molecular weights above 8,000 from monoepoxy compounds which comprises heating at a temperature above 70° C. a dibasic acid anhydride with a monoepoxide in the presence of a catalyst of the group consisting of tertiary amines and quaternary ammonium salts, under substantially anhydrous conditions, the active hyrogen in the reaction mixture being below 0.026 eq./100 g. The invention further provides high molecular weight linear polymers prepared by the above-described process.

Monoepoxides are potentially useful material for use in preparing polyesters as they act as glycols in reaction with dibasic anhydrides. Their use in this reaction has not been too successful, however, as the products obtained have generally been soft solids to liquids of relatively low molecular weight. In addition, the reaction has required the use of relatively high temperatures and this has resulted in the formation of dark colored products.

It is an object of the invention, therefore, to provide a new process for preparing polyesters. It is a further object to provide a process for preparing linear high molecular weight polyesters from monoepoxy compounds. It is a further object to provide a process for preparing polyesters from monoepoxides that give products having molecular weights above 8,000. It is a further object to provide a new process for preparing polyesters from monoepoxides that are solid and can be molded to form valuable articles. It is a further object to provide a new process for preparing polyesters from monoepoxides that give light colored products. These and other objects will be apparent from the following detailed description of the invention.

It has now been discovered that these and other objects may be accomplished by the process of the invention which comprises heating at a temperature above 70° C. a polybasic acid anhydride with a monoepoxide in the presence of a catalyst of the group consisting of tertiary amines and quaternary ammonium salts, under substantially anhydrous conditions, the active hydrogen in the reaction mixture being below 0.026 eq./100 g. It has been found that by the use of this process one can obtain linear polyesters having molecular weights which are above 8,000 and preferably in the range of about 10,000 to 25,000. In addition, the products are colorless to light colored solids which have melting points in the range of about 100° C. to 150° C. and can be injection molded to form many valuable articles. The orthophthalate esters prepared from ethylene oxide are particularly attractive as they are highly crystalline and the first crystalline polyesters of this composition to be reported. The polyesters prepared from monoepoxides having side chain groups, such as allyl glycidyl ether, vinyl cyclohexane mono-epoxide and alpha-epoxydodecene, are also of value, as they may be cross-linked through such groups to form insoluble infusible products or may have their solubility changed so that they may be used as additives for oils and the like.

The acid anhydrides to be used in the process of the invention comprise the dicarboxylic acid anhydrides possessing at least one anhydride group, i.e. a

group. The acids used in the formation of the anhydrides may be saturated, unsaturated, aliphatic, cycloaliphatic, aromatic or heterocyclic. Examples of these anhydrides include, among others, phthalic anhydride, di-, tetra- and hexahydrophthalic anhydride, 3,4,5,6,7,7-hexachloro-3,6-endomethylene 1,2,3,6-tetrahydrophthalic anhydride (chlorendic anhydride), succinic anhydride, maleic anhydride, chlorosuccinic anhydride, monochloromaleic anhydride, 6-ethyl-, 4-cyclohexadiene-1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic anhydride, dioctylsuccinic anhydride, nonadecadienylsuccinic anhydride, 3-methoxy-1,2,3,6-tetrahydrophthalic acid anhydride, 3-butoxy-1,2,3,6-tetrahydrophthalic acid anhydride, polyadipic acid anhydride, polysebacic acid anhydride, polyisophthalic anhydride, the maleic anhydride adduct of unsaturated oils, such as linseed oil, and the like, and mixtures thereof.

Preferred anhydrides to be employed in the process comprise the aliphatic, cycloaliphatic and aromatic anhydrides of dibasic acids containing up to 15 carbon atoms and the chlorinated derivatives of the afore-described anhydrides. Especially preferred are the aromatic anhydrides.

The material to be reacted with the polybasic acid anhydrides comprising the monoepoxides, i.e. compounds possessing a single epoxy group, i.e. a

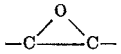

group. These compounds may be aliphatic, cycloaliphatic, aromatic or heterocyclic and may be saturated or unsaturated. They may also be substituted with substituents which do not interfere with the reaction, such as ester groups, ether groups, halogen atoms and the like. Examples of these monoepoxides include, among others, styrene oxide, phenyl glycidyl ether, allyl glycidyl ether, octadecyl glycidyl ether, amyl glycidyl ether, tolyl glycidyl ether, chlorophenyl glycidyl ether, diacetate of monoglycidyl ether of glycerol, dipropionate of the monoglycidyl ether of glycerol, diacrylate of the monoglycidyl ether of glycerol, ethylene oxide, propylene oxide, 1,2-hexylene oxide, 1-heptylene oxide, 3-ethyl-1, 2-pentylene oxide, epichlorohydrin, butylene oxide, decylene oxide, octadecylene oxide, glycidyl acetate, glycidyl benzoate, glycidyl propionate, glycidyl acrylate, glycidyl methacrylate, glycidyl allyl phthalate, glycidyl methyl maleate, glycidyl stearate, glycidyl oleate, methyl 1,2-epoxypropionate, butyl 1,2-epoxypropionate and the like.

Preferred monoepoxide to be used in the claimed process comprising the monoepoxy-substituted hydrocarbons containing no more than 12 carbon atoms, the monoepoxy substituted alkyl ethers of hydrocarbon monohydric alcohols or phenols containing no more than 12 carbon atoms, and the monoepoxy-substituted alkyl esters of hydrocarbon monocarboxylic acids, the epoxy-substituted alkyl esters of hydrocarbon polycarboxylic acids wherein the other carboxyl groups are esterified with alkanols, alkyl and alkenyl esters of 1,2-epoxymonocarboxylic acids, epoxy-alkyl ethers of polyhydric alcohols wherein the other OH groups are esterified or etherified with hydrocarbon acids or alcohols and monoesters of polyhydric alcohols and 1,2-monocarboxylic acids wherein the other OH groups are esterified or etherified with hydrocarbon acids or alcohols.

Especially preferred are terminal monoepoxides, i.e. compounds possessing a

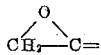

group,

The activators for the reaction comprise a member of the group consisting of tertiary amines and quaternary ammonium salts. Examples of tertiary amines include, among others, p,p'-bis(dimethylaminophenyl)methane, dimethyl aniline, benzyldimethyl amine, N,N-dimethyl propylamine, dibutyl propylamine, stearyldimethylamine, tri-n-butylamine, N,N-dibutyl butyl amine, tri-n-hexylamine, ethyl di-n-propylamine and the like and mixtures thereof. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like and mixtures thereof.

Preferred activators to be used are the hydrocarbon tertiary amines, and more preferably the mono- and diamines wherein the amine hydrogen have been replaced by aliphatic, cycloaliphatic or aromatic hydrocarbon radicals containing not more than 15 carbon atoms, such as, for example, the trialkyl amines, triaryl amines, triaryl alkylamines, alkyl alkylamines, tricycloalkylamines and alkyldicycloalkylamines. The preferred quaternary salts are those of the formula

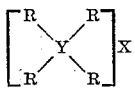

wherein Y is nitrogen, R is an alkyl, aryl or arylalkyl radical, preferably containing no more than 12 carbon atoms and X is chlorine.

The high molecular weight linear polyesters are obtained by heating any one or more of the above-described polybasic acid anhydrides with any one or more of the above-described monoepoxides in the presence of at least one of the special catalysts described above under substantially anhydrous conditions with the active hydrogen in the reaction mixture being below 0.026 eq./100 g.

The amount of the dibasic acid anhydride and monoepoxide used in the reaction may vary over a wide range as it has been found that under the conditions of the present process, the rate, molecular weight and product composition are independent of monomer concentration. It is generally preferred, however, to react the anhydride with at least an equivalent amount of the monoepoxide, and still more preferably with from 1 to 3 equivalents of the monoepoxide. As used herein in reference to the amount of anhydride and monoepoxide, a chemical equivalent is the amount of monoepoxide needed to furnish one epoxy group for every anhydride group. This is in effect furnishing one OH group for every carboxyl group.

The special tertiary amine or quaternary ammonium salt catalyst is preferably employed in an amount varying from about 0.08 part to 2.0 parts by weight per mole (expressed in parts by weight) of the anhydride reactant, and still more preferably an amount varying from 0.1 to 0.3 part per mole of the anhydride.

It has been found that the presence of water interferes with the formation of the high molecular weight products and must be excluded. The reaction is therefore conducted under substantially anhydrous conditions. This can be accomplished by use of anhydrous reactants, anhydrous reaction vessels and use of drying tubes during the course of the reaction.

The reaction mixture also must have an active hydrogen content below 0.026 eq./100 g. By active hydrogen is meant hydrogen attached to oxygen, nitrogen or sulfur. The amount of these groups in the initial mixture can be easily determined by standard analytical methods. To ensure that this condition is complied with, it is best to use highly purified anhydrides and monoepoxides as these components in many cases contain impurities have OH and carboxyl values. Preferably the active hydrogen content is below 0.02 eq./100 g.

The mixture of anhydride, monoepoxide and catalyst is heated at a temperature of at least 70° C. and not more than 180° C. Preferred temperatures range from about 70° C. to 150° C. Temperatures above 200° C. should not be employed.

The reaction is preferably conducted under atmospheric pressure, but it may be advantageous in some cases to employ subatmospheric or superatmospheric pressures.

The heating of the mixture is continued until the acidity has reached a constant value, e.g. 0.01 eq./100 g. or less. In most cases, the reaction may be completed in periods of 1 to 5 or 6 hours. However, in some cases, longer periods may be necessary.

After the reaction has stopped, the polyester can be recovered by any suitable means. If any of the reactants have been employed in great excess, they can first be removed by suitable means, such as distillation, extraction and the like. The polyester may then be purified by precipitation from solvents, extraction and the like.

As noted above, the products are colorless to light colored solids. They have molecular weights above about 8,000 and preferably in the range of 10,000 to 25,000. The molecular weights reported herein are determined ebullioscopically in benzene or dichloroethane. In some cases, as with those from the alkylene oxides, they are highly crystalline materials. The products are relatively high melting and preferably have melting points above about 100° C.

The products of the invention are particularly suited for use in preparation of moldings as they may be extruded or injection molded to form valuable articles of commerce, such as toys, combs, containers and the like.

The products prepared from monoepoxides having reactive side groups, such as reactive double bonds, such as those obtained from vinyl cyclohexene monoepoxide and allyl glycidyl ether, may be cross-linked through the double bond side chains to form thermosetting insoluble products. These materials are ideally suited for making surface coatings or for preparing pottings and castings and laminated articles.

The products having long side chains, such as those obtained from alpha-epoxydodecane have good compatibility and solubility characteristics and may be added to lubricating oils as pour point and viscosity improvers.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

*Example I*

(A) This portion of the example illustrates the preparation and properties of a linear high molecular weight polyester from phthalic anhydride and epichlorohydrin using the process of the present invention.

148 parts (1 mol) of phthalic anhydride, 91 parts (1 mol) of epichlorohydrin and 0.2 part of benzyldimethylamine were added to a reaction flask equipped with stirrer, thermometer, drying tube and reflux condenser. The reactants had been purified so that the total reaction mixture had a total active hydrogen value of 0.018 eq./100 g. The mixture was heated to 100° C. and stirred. After 2 hours, the temperature was raised to 140° C. and held there for 4 hours. The product was then dissolved in 3 times its weight of 1,2-dichloroethane and then poured with stirring into 4 times the volume of ether. The product was separated from the ether phase, washed several times with ether and dried in vacuo at 50° C. The resulting product was a colorless solid. Analysis indicated it was a linear polyester having a molecular weight of 11,200, an OH value of 0.014 eq./100 g. and acidity of 0.004 eq./100 g. The product could be molded at 120° C. to form various objects of commerce, such as containers, etc.

(B) This portion of the example illustrates the necessity of keeping the active hydrogen content below 0.026 eq./100 g.

148 parts of phthalic anhydride, 91 parts of epichlorohydrin and 0.2 part of benzyldimethylamine were added to the reaction flask as in (A) above. This mixture, however, had an active hydrogen content of 0.036 eq./100 g. The mixture was heated for 24 hours at 100° C. and then for one hour at 170° C. The mixture was then treated as in (A) wherein it was dissolved in dichloroethane, precipitated in ether, washed with ether and dried. This product was a polyester having a molecular weight of only 5,300.

(C) This portion of the example illustrates the necessity of using one of the special catalyst and temperatures below 180° C.

148 parts of phthalic anhydride and 91 parts of epichlorohydrin were placed in the reaction flask as in (A) above. The mixture was heated and in order to effect the reaction had to be heated to 200° C. The resulting product in this case was a dark thick viscous liquid product of low molecular weight.

*Example II*

The process in Example I (A) was repeated with the exception that the mixture had an active hydrogen content of 0.012 eq./100 g. and was heated for 10 hours at 90° C. and 1 hour at 140° C. The resulting product was a solid light colored linear polyester having a molecular weight of 11,500.

*Example III*

The process in Example I (A) was repeated with the exception that the mixture had an active hydrogen content of .007 eq./100 g. and was heated for 5 hours at 100° C. and 2 days at 160° C. The resulting product was a solid light colored linear polyester having a molecular weight of 18,400.

*Example IV*

This example illustrates the preparation and properties of a linear high molecular weight polyester from phthalic anhydride and a mixture of allyl glycidyl ether and epichlorohydrin.

296 parts of phthalic anhydride, 91 parts of epichlorohydrin and 114 parts of allyl glycidyl ether and 0.2 part of benzyldimethylamine were added to a reaction flask equipped with stirrer, thermometer, drying tube and reflux condenser. The mixture was heated for 12 hours at 100° C. with stirring. The product was then dissolved in 3 times the weight of 1,2-dichloroethane and then poured with stirring into 4 times the volume of ether. The product was separated from the ether phase, washed several times with ether and dried in vacuo at 50° C. The resulting product was a colorless solid. Analysis indicated it was a linear polyester having a molecular weight of 9,500, an OH value of 0.010 eq./100 g. and an acidity of 0.009 eq./100 g. This product was molded at 120° C. to form valuable articles of commerce.

*Example V*

This example illustrates the preparation and properties of a linear high molecular weight polyester from phthalic anhydride and cyclohexene oxide.

148 parts of phthalic anhydride, 196 parts (2 moles) of cyclohexene oxide and 0.2 part of benzyldimethylamine were added to the reaction flask as described in Example I. The mixture was heated to 70° C. for fourteen hours with stirring. The product was then dissolved in 3 times its weight of 1,2-dichloroethane and then poured with stirring into 4 times the volume of ether. The product was separated from the ether phase, washed several times with ether and dried in vacuo at 50° C. The resulting product was a colorless solid. Analysis indicated it was a linear polyester having a molecular weight of 11,000, an OH value of 0.017 eq./100 g. and an acidity of 0.001 eq./100 g. This product can be easily molded at temperatures of about 120° C. to form valuable articles.

*Example VI*

This example illustrates the preparation and properties of a linear high molecular weight polyester from a mixture of phthalic anhydride and maleic anhydride and epichlorohydrin.

148 parts of phthalic anhydride, 98 parts of maleic anhydride and 182 parts (2 moles) of epichlorohydrin with 0.2 part of benzyldimethylamine were added to a reaction flask as in Example I. The components had been purified so that the active hydrogen content of the mixture was about 0.011 eq./100 g. The mixture was heated for 4 hours at 100° C. The product was dissolved in 3 times the weight of 1,2-dichloroethane and then poured with stirring into 4 times the volume of ether. The product was separated from the ether phase, washed with ether and dried. The resulting product was a colorless solid. Analysis indicated it was a linear polyester having a molecular weight of 8,900, an OH value of 0.01 eq./100 g. and an acidity of 0.005 eq./100 g. This product could be molded at 120° C. to form valuable articles of commerce.

The above process was repeated with the exception that the tertiary amine was replaced by each of the following: dimethylaniline, stearyldimethylamine and benzyltrimethylammonium chloride.

*Example VII*

This example illustrates the preparation and properties of a linear high molecular weight polyester from tetrachlorophthalic anhydride and ethylene oxide.

290 parts of tetrachlorophthalic anhydride and 44 parts of ethylene oxide and 0.2 part of benzyldimethylamine were added to the flask as in Example I. The reaction mixture had an active hydrogen content of 0.018 eq./100 g. The mixture was heated for 11 hours at 130–135° C. The product was then recovered as in the preceding examples. The resulting product was a crystalline solid linear polyester having a molecular weight of about 11,000. The product had an OH value of 0.018 and an acidity of <0.001. This product could also be molded to form valuable articles.

I claim as my invention:

1. A process for preparing linear polyesters having a molecular weight above 8,000 which comprises heating at a temperature between 70° C. and 180° C. a dicarboxylic acid anhydride which contains a cyclic

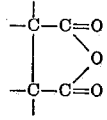

group with at least a chemical equivalent amount of an organic compound having as the sole group reactive with the anhydride group a single

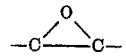

group, in the presence of from 0.08 part to 2.0 parts by weight of the anhydride of a member of the group consisting of tertiary amines and quaternary ammonium salts, under substantially anhydrous conditions and with the active hydrogen content of the reaction mixture being below 0.026 gram equivalents per 100 grams, the expression chemical equivalent amount as used herein relative to the anhydride and monoepoxide referring to that amount needed to furnish one epoxy group per anhydride group, and the expression active hydrogen referring to hydrogen attached to a member of the group consisting of oxygen, nitrogen and sulfur.

2. A process as in claim 1 wherein the compound containing the single

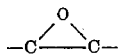

group is epichlorohydrin.

3. A process as in claim 1 wherein the compound containing the single

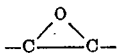

group is ethylene oxide.

4. A process as in claim 1 wherein the compound containing the single

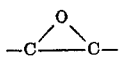

group is cyclohexene oxide.

5. A process as in claim 1 wherein the compound containing the single

group is allyl glycidyl ether.

6. A process as in claim 1 wherein the dicarboxylic acid anhydride is phthalic anhydride.

7. A process for preparing linear polyesters having a molecular weight above 8,000 which comprises heating at a temperature between 90° C. and 160° C. a dicarboxylic acid anhydride which contains a cyclic

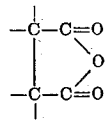

group and up to 15 carbon atoms with at least a chemical equivalent amount of an organic compound containing only carbon, hydrogen and oxygen and having as the sole group reactive with the anhydride a single

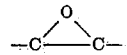

group, in the presence of from 0.08 part to 2.0 parts by weight of the anhydride of a tertiary amine under substantially anhydrous conditions and wherein the active hydrogen content of the reaction mixture is below 0.020 gram equivalent amount as used herein relative to the anhydride and monoepoxide referring to that amount needed to furnish one epoxy group per anhydride group, and the expression active hydrogen referring to hydrogen attached to a member of the group consisting of oxygen, nitrogen and sulfur.

8. A process for preparing linear polyesters having a molecular weight above 8,000 which comprises heating at a temperature between 90° C. and 160° C. an aromatic dicarboxylic acid anhydride which contains a cyclic

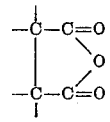

group with at least a chemical equivalent amount of an organic compound possessing from 2 to 12 carbon atoms and having as the sole group reactive with the anhydride a single

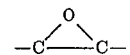

group, in the presence of .08 to 2.0 parts by weight of anhydride of a tertiary amine under anhydrous conditions and with the active hydrogen content of the initial reaction mixture being below 0.026 gram equivalents per 100 grams, the expression chemical equivalent amount as used herein relative to the anhydride and monoepoxide referring to that amount needed to furnish one epoxy group per anhydride group, and the expression active hydrogen referring to hydrogen attached to a member of the group consisting of oxygen, nitrogen and sulfur.

9. A process as in claim 8 wherein the anhydride is tetrachlorophthalic acid anhydride.

10. A process as in claim 8 wherein the anhydride is maleic anhydride.

11. A process as in claim 8 wherein the amine in a hydrocarbon tertiary amine containing no more than 10 carbon atoms.

12. A process for preparing a high molecular weight linear polyester which comprises heating at a temperature of 70° C. to 180° C. tetrachlorophthalic anhydride with from 1 to 2 moles per mole of anhydride of ethylene oxide in the presence of from 0.08 to 2.0 parts by weight of anhydride of a tertiary amine under anhydrous conditions and wherein the active hydrogen content of the reaction mixture is below 0.026 gram equivalents per 100 grams, the expression active hydrogen referring to hydrogen attached to a member of the group consisting of oxygen, nitrogen and sulfur.

References Cited in the file of this patent

UNITED STATES PATENTS

| 2,779,783 | Hayes | Jan. 29, 1957 |
| 2,822,350 | Hayes | Feb. 4, 1958 |

FOREIGN PATENTS

| 500,300 | Great Britain | Feb. 7, 1939 |
| 518,057 | Great Britain | Feb. 15, 1940 |

OTHER REFERENCES

Dearborn et al.: Ind. and Eng. Chem., vol. 45, No. 12, December 1953, pages 2715–2721.

Bucher et al.: Jour. Amer. Chem. Soc., vol 31 (1909), pp. 1319–1321.

Shechter et al.: Ind. and Eng. Chem., vol. 48, No. 1, pp. 86–93 (January 1956).

Chemical Abstracts, vol. 46, No. 24, pp. 5923–5924.